United States Patent [19]

Beuchel et al.

[11] 4,175,003
[45] Nov. 20, 1979

[54] GRID FOR NUCLEAR REACTOR FUEL ASSEMBLIES

[75] Inventors: Peter H. Beuchel; Eric G. Cooper, both of Columbia, S.C.

[73] Assignee: Westinghouse Electric Corp., Pittsburgh, Pa.

[21] Appl. No.: 754,050

[22] Filed: Dec. 23, 1976

[51] Int. Cl.² ........................................... G21C 3/30
[52] U.S. Cl. ................................. 176/76; 176/78
[58] Field of Search ............................ 176/76, 78

[56] References Cited

U.S. PATENT DOCUMENTS

| | | | |
|---|---|---|---|
| 3,301,764 | 1/1967 | Timbs et al. | 176/76 X |
| 3,853,701 | 12/1974 | Sasaki et al. | 176/76 X |
| 3,920,515 | 11/1975 | Ferrari et al. | 176/78 |
| 3,929,569 | 12/1975 | Piepers et al. | 176/78 |
| 3,954,560 | 5/1976 | Delafosse et al. | 176/78 |
| 3,966,550 | 6/1976 | Foulds et al. | 176/78 |

*Primary Examiner*—Peter A. Nelson
*Attorney, Agent, or Firm*—J. R. Campbell; Z. L. Dermer

[57] ABSTRACT

A grid of improved design for a nuclear reactor fuel assembly which includes a multiplicity of interleaved straps enclosed in a peripheral frame which forms a grid of egg-crate configuration. Each cell formed by the grid straps, except those containing control rod guide tubes, supports a fuel rod which is held in place by springs projecting laterally inwardly into each cell from the grid straps. The springs extend parallel to the fuel rods and are spaced at 90° intervals around the rod. Further, each of two adjacent springs contact a fuel rod at two points along its length and each of the other two adjacent springs contact the fuel rod at one point thus imparting strength and flexibility to the fuel assembly containing such grids.

4 Claims, 2 Drawing Figures

GRID FOR NUCLEAR REACTOR FUEL ASSEMBLIES

BACKGROUND OF THE INVENTION

The invention described herein relates to nuclear reactor fuel assemblies and more particularly to an improved grid used in holding fuel rods and control rod guide tubes in spaced relationship with each other in a fuel assembly.

Many different designs of grids are used for holding fuel rods and control rod guide tubes in spaced relationship with each other in a nuclear reactor fuel assembly. One well known design disclosed in U.S. Pat. No. Re. 28,079 includes interleaved grid straps which form multiple cells arranged to contain the fuel rods and guide tubes. The fuel rod in each cell is supported by springs on two adjacent straps which project inwardly and contact two sides of the fuel rods. Each of the other two adjacent straps contain a pair of vertically spaced dimples which contact the other two sides of the fuel rod thus providing a six point support to the rod. This design provides many benefits, such as resiliently supporting fuel rods in each egg-crate cell and acting to accurately space the fuel rods while minimizing fuel rod vibration and permitting fuel rod thermal expansion during reactor operation.

The disadvantages however are that the dimples occasionally are torn from the metal surface during the time a fuel rod is being loaded into the grid and since the fuel rod is then not properly supported, the grid must be removed from the fuel assembly being assembled. Further, special dies are required to punch out the springs and dimples with a high degree of precision and accuracy to assure that coolant flow distribution along the fuel rods and through the grids will be uniform and constant. Manufacturing labor costs are therefore relatively high. Also, since the grids usually are made of Inconel, which work hardens very quickly, cracks occasionally appear at the point where the dimples are punched outwardly from the stock material. Since extremely high standards and tolerances are set for the manufacture and quality of grid components, small defects which would not affect reactor performance often require scrapping of the grid material.

SUMMARY OF THE INVENTION

The above described disadvantages are eliminated in accordance with this invention by providing a grid of interleaved straps arranged to form multiple cells designed to contain fuel rods. Each of two adjacent straps contain springs having two contact points which project inwardly from the strap walls while the other two adjacent straps which cooperate with the first two to form a cell, contain springs, each having one contact point, which likewise project inwardly from the strap walls into the cell. As a fuel rod is drawn into the cell, it rides up contoured walls on the spring surface and into position to be supported by a total of six contacts on the four springs.

An object of the invention, therefore, is to provide an improved grid for a nuclear reactor fuel assembly which will impart improved support to fuel rods and minimize fretting of fuel assembly components.

Another object of the invention is to provide an improved grid for a nuclear reactor fuel assembly which can be manufactured at a cost less than current designs while reducing die maintenance costs and inspection operations.

BRIEF DESCRIPTION OF THE DRAWINGS

While the specification concludes with claims particularly pointing and distinctly claiming the subject matter of the invention, it is believed that the invention will be better understood from the following description taken in connection with the accompanying drawing wherein:

DESCRIPTION OF THE PREFERRED EMBODIMENTS

Figure 1:
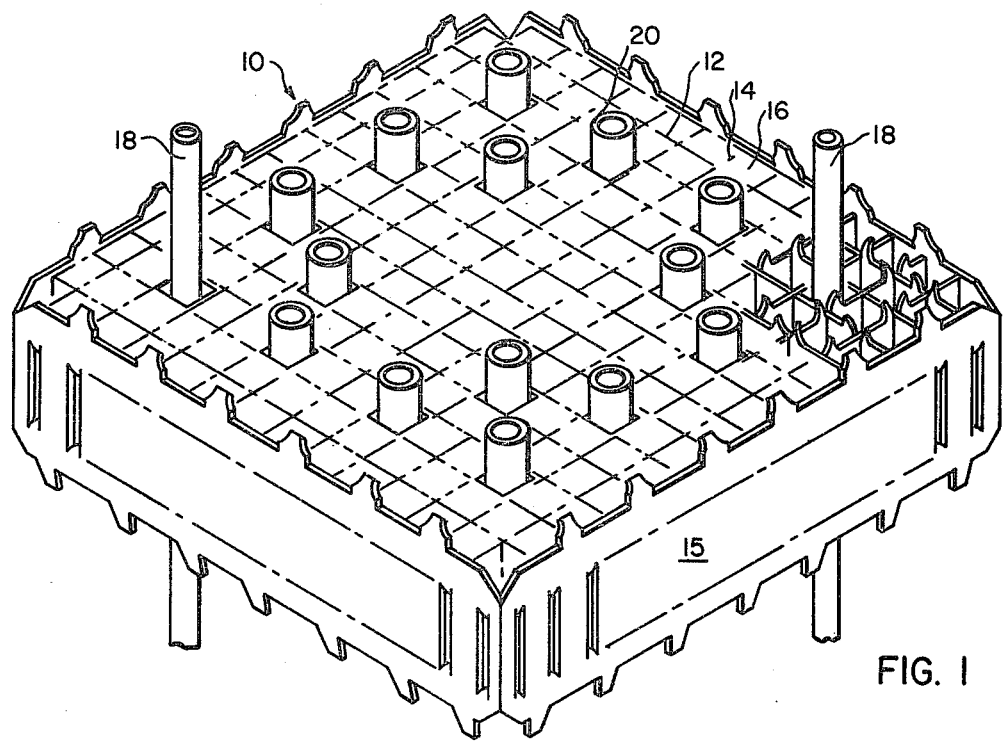
FIG. 1 is a general showing a fuel assembly grid.

Referring now to the drawing wherein like reference characters designate like or corresponding parts throughout the several views, there is shown in FIG. 1, a grid 10 for a nuclear reactor fuel assembly. The grid consists of interleaved straps 12, 14 enclosed in a peripheral frame 15 which form openings or cells 16 of egg-crate configuration. Such cells are designed to accept fuel rods 18 (only a few shown) and control rod guide tubes 20 which serve to accommodate control rods during reactor operation.

Figure 2:
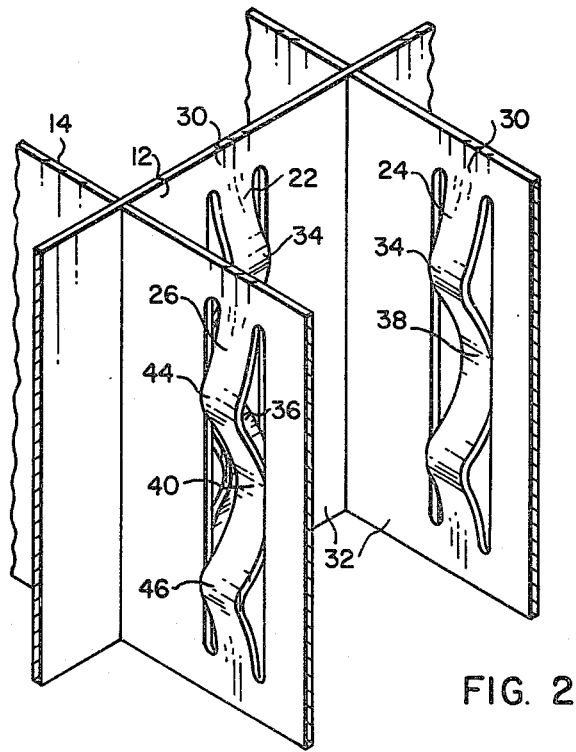
FIG. 2 is a detailed view of interleaved straps more clearly illustrating the improved spring design and arrangement.

As indicated above, previous grids use a combination of dimples and springs for holding fuel rods in position in a grid. The improved grid of this invention uses interleaved straps as in the old designs but the dimples have been replaced by springs so that each fuel rod accordingly is held in position in each cell by a six point spring supporting arrangement. As shown in FIG. 2, each of the springs 22, 24, 26, 28 are spaced at 90° intervals and may take a generally sinuous form along the length or be of the design illustrated in U.S. Pat. No. Re. 28,079, for example. The FIG. 2 springs 22, 24 are integrally formed with and merge directly into the strap material at both the top and bottom portions 30, 32. The spring sections 34, 36 intermediate the top and bottom portions of each of springs 22, 24 project inwardly into one cell to engage two sides of a fuel rod while the spring section 38 on these two springs project outwardly into the next adjacent cell.

The remaining two springs 26, 28 in the adjacent straps which form the cell, each have the middle section 40, (only one spring shown in FIG. 2) projecting into the cell to engage a fuel rod on the other two sides. The spring sections 44, 46 of springs 26, 28 each project into the next cells to help support fuel rods adapted for positioning therein. The complete grid arrangement therefore includes the sections of four springs which project into each cell for fuel rod supporting purposes.

Since both sections 34, 36 of each spring 22, 24 contact the fuel rod along its length, it will be apparent the fuel rod is supported by a total of four contact points on the two springs. The other two springs 26, 28 formed in the other two straps have sections 38 which project into the same cell and these two spring sections contact the fuel rod on its other two sides but at only a total of two points of contact, because only one section of each spring is directed inwardly. It therefore is apparent the fuel rod will be supported by a total of six spring contacts on four sides. Since each cell includes the same arrangement of springs, except those cells containing control rod guide tubes, instrumentation probes, or the like, all fuel rods passing through a grid will be held in spaced relationship with other fuel rods in the grid.

The above described grid design obviously eliminates the grid strap dimples of the prior art and will therefore improve the fuel rod loading capability since possible tearing or deformation of dimples will no longer occur. According to present practices, the fuel rods are pulled into each grid cell and if too much force is exerted by the fuel rod against one or both dimples in the cell as the fuel rod is actually pulled therethrough, the material of the strap material may actually tear or deform during the loading process. The tolerances are so close that if cracks appear near the dimples, or if other deformation of a dimple material of the strap takes place, it is necessary to discard the particular grid in question and this action obviously involves substantial expense to the manufacturer. The resilient nature of the springs is such that they will permit each fuel rod to assume a set position in each grid cell, thus relieving stresses throughout each fuel assembly structure while simultaneously providing uniform rod-to-rod spacing throughout the assembly. The use of springs will further permit thermal expansion and contraction in both axial and radial directions of the fuel rods, and vibration of each rod will be minimized because of the flexibility characteristics of the spring supports.

It will be apparent that many modifications and variations are possible in light of the above teachings. It therefore is to be understood that within the scope of the appended claims, the invention may be practiced other than as specifically described.

We claim as our invention:

1. A grid for a nuclear reactor fuel assembly comprising:
    a multiplicity of straps interleaved with each other to form a structure of egg-crate configuration which includes individual cells adapted to contain fuel rods and control rod guide tubes;
    a spring projecting inwardly into each cell designated to hold a fuel rod from that portion of each strap which cooperates with the other three strap portion to define the four walls of each cell;
    each of said springs being pressed from said strap portion and having its top and bottom ends merging directly into the material of said strap;
    each of the four springs projecting inwardly into each cell further being of generally sinusoidal shape and having at least one surface thereon arranged to contact the surface of a fuel rod adapted to extend through a cell;
    thereby providing at least a four point resilient support for a fuel adapted to extend through said cell to thereby permit fuel rod axial and radial expansion and contraction without distortion.

2. The combination according to claim 1 wherein each of said springs includes three sections which lie outside the plane of the strap wall, the arrangement being such that each cell contains spring sections positioned to contact at 90° intervals at least four sides of a fuel rod adapted to extend axially through said cell.

3. The combination according to claim 2 wherein two sections of at least two springs project into separate adjacent cells; and
    one section on each of the other two springs projects into said one cell and the two sections on each of said other two springs respectively project into separate adjacent cells;
    the arrangement being such that all cells in the grid may contain the sections of four springs spaced at 90° intervals which serve to provide support for a fuel rod adapted to extend through each of said cells.

4. The combination according to claim 3 wherein said two spring sections of two springs contact the fuel rod along its axial length, and the springs having said one section projecting into a cell, contact the fuel rod surface at a point intermediate the two sections on the springs.

* * * * *